(12) United States Patent
Sullivan

(10) Patent No.: US 8,511,629 B2
(45) Date of Patent: Aug. 20, 2013

(54) MOUNTING DEVICE

(75) Inventor: Chad Sullivan, Wisconsin Rapids, WI (US)

(73) Assignee: L&P Property Management Company, South Gate, CA (US)

( * ) Notice: Subject to any disclaimer, the term of this patent is extended or adjusted under 35 U.S.C. 154(b) by 724 days.

(21) Appl. No.: 12/688,946

(22) Filed: Jan. 18, 2010

(65) Prior Publication Data
US 2011/0174937 A1 Jul. 21, 2011

(51) Int. Cl.
F16M 11/00 (2006.01)

(52) U.S. Cl.
USPC ............... 248/286.1; 248/291.1; 248/917

(58) Field of Classification Search
USPC ............ 248/298.1, 276.1, 291.1, 292.14, 248/286.1, 917, 918, 919, 920, 503
See application file for complete search history.

(56) References Cited

U.S. PATENT DOCUMENTS

| 4,946,120 | A | * | 8/1990 | Hatcher | 248/183.2 |
|---|---|---|---|---|---|
| 5,240,215 | A | | 8/1993 | Moore | |
| 5,443,237 | A | * | 8/1995 | Stadtmauer | 248/441.1 |
| 5,673,628 | A | * | 10/1997 | Boos | 108/44 |
| 6,164,611 | A | | 12/2000 | Kuhnke | |
| 7,316,378 | B1 | * | 1/2008 | Curran et al. | 248/298.1 |
| 7,946,542 | B1 | * | 5/2011 | Chapman | 248/122.1 |
| 2008/0179478 | A1 | * | 7/2008 | Lee | 248/276.1 |

OTHER PUBLICATIONS

Gamber-Johnson, 12" Locking Slide Arm, 2009, 1 page, admitted prior art.
Gamber-Johnson, Four Motion Attachment, 2009, 1 page, admitted prior art.
Havis-Shields, Titan Mount, 2008, 4 pages, admitted prior art.
Ledco, Cobra Swing Arm, date unknown, 2 pages, admitted prior art.

* cited by examiner

Primary Examiner — Terrell McKinnon
Assistant Examiner — Steven Marsh
(74) Attorney, Agent, or Firm — Michael Best & Friedrich LLP

(57) ABSTRACT

A mounting device for mounting an object on a support includes a base configured to be coupled to the support, and a slide arm coupled to the base and movable between a retracted position and a plurality of extended positions. The slide arm is movable from any of the plurality of extended positions to the retracted position by sliding the slide arm relative to the base without any other manipulation of the mounting device by the user. The slide arm automatically locks relative to the base when the slide arm is moved to the retracted position.

14 Claims, 8 Drawing Sheets

MOUNTING DEVICE

BACKGROUND

The present invention relates to mounting devices, and more particularly to mounting devices for computers, radios, and other equipment.

Mounting devices are known for mounting computers, radios, and other equipment to a support structure. Such mounting devices are often designed for use in vehicles (e.g., police vehicles, ambulances, delivery vehicles, and the like).

SUMMARY

In one aspect, the invention provides a mounting device for mounting an object on a support. The mounting device includes a base configured to be coupled to the support, a slide arm coupled to the base and movable between a retracted position and a plurality of extended positions, and a locking mechanism coupled with at least one of the slide arm and the base and operable to lock the slide arm relative to the base only when the slide arm is in the retracted position.

In another aspect, the invention provides a mounting device for mounting an object on a support. The mounting device includes a support member, a base coupled to the support member to permit selective rotation of the base relative to the support member, a slide arm coupled to the base and movable between a retracted position and a plurality of extended positions, and a locking mechanism coupled with at least one of the slide arm and the base and operable to lock the slide arm relative to the base only when the slide arm is in the retracted position.

In yet another aspect, the invention provides a mounting device for mounting an object on a support. The mounting device includes a base configured to be coupled to the support, and a slide arm coupled to the base and movable between a retracted position and a plurality of extended positions. The slide arm is movable from any of the plurality of extended positions to the retracted position by sliding the slide arm relative to the base without any other manipulation of the mounting device by the user. The slide arm automatically locks relative to the base when the slide arm is moved to the retracted position.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
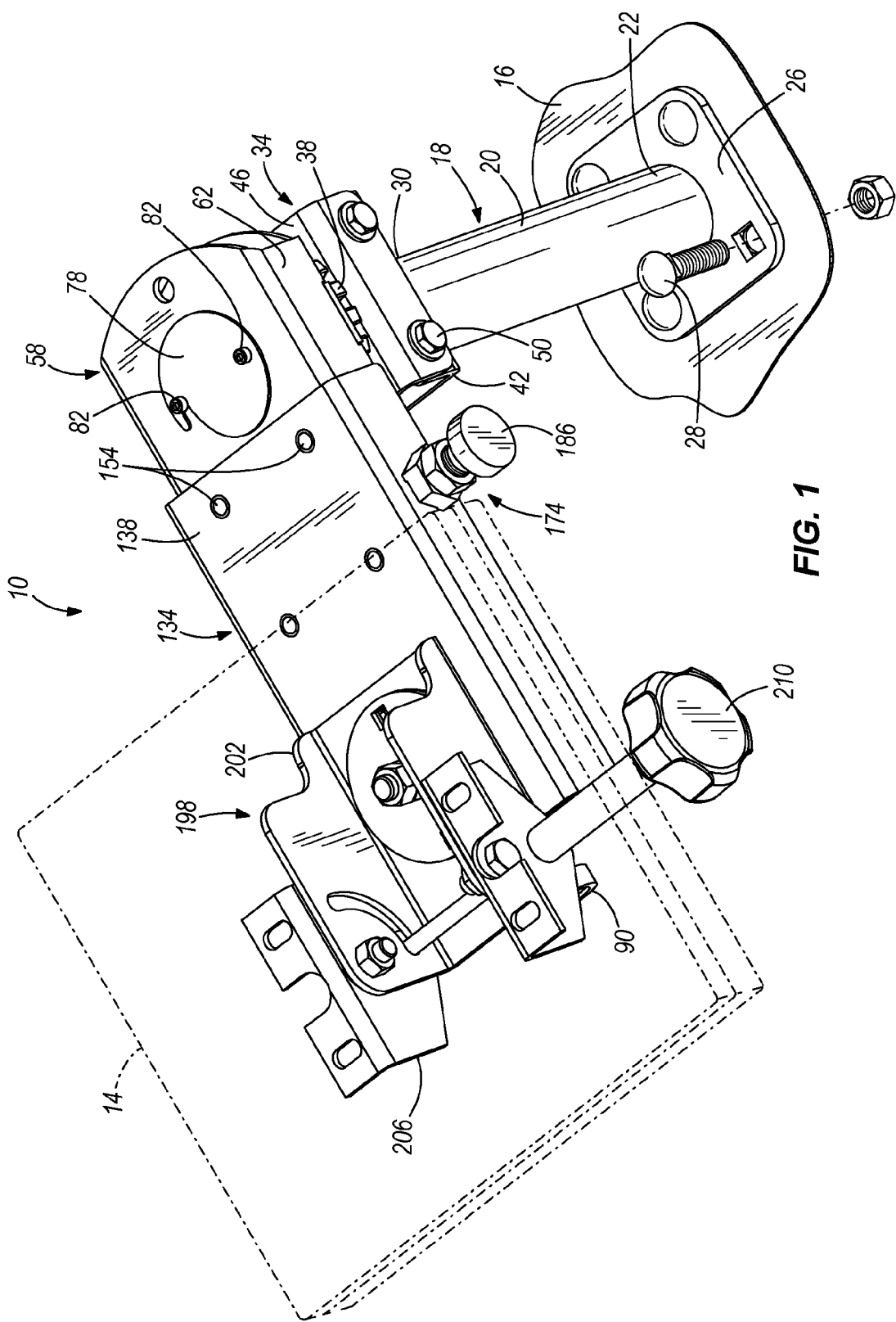
FIG. 1 is a perspective view of mounting device embodying the invention.

FIGS. 1-9 illustrate a mounting device 10 for mounting an object, such as a computer 14 (see FIG. 1), on a support 16, such as a vehicle floor or other support structure. While FIG. 1 illustrates a laptop-style computer 14, it is understood that other types of computers (e.g., tablet-style computers), or other objects (e.g., radios and other electronic equipment) can also be mounted and supported by the mounting device 10.

Figure 8:
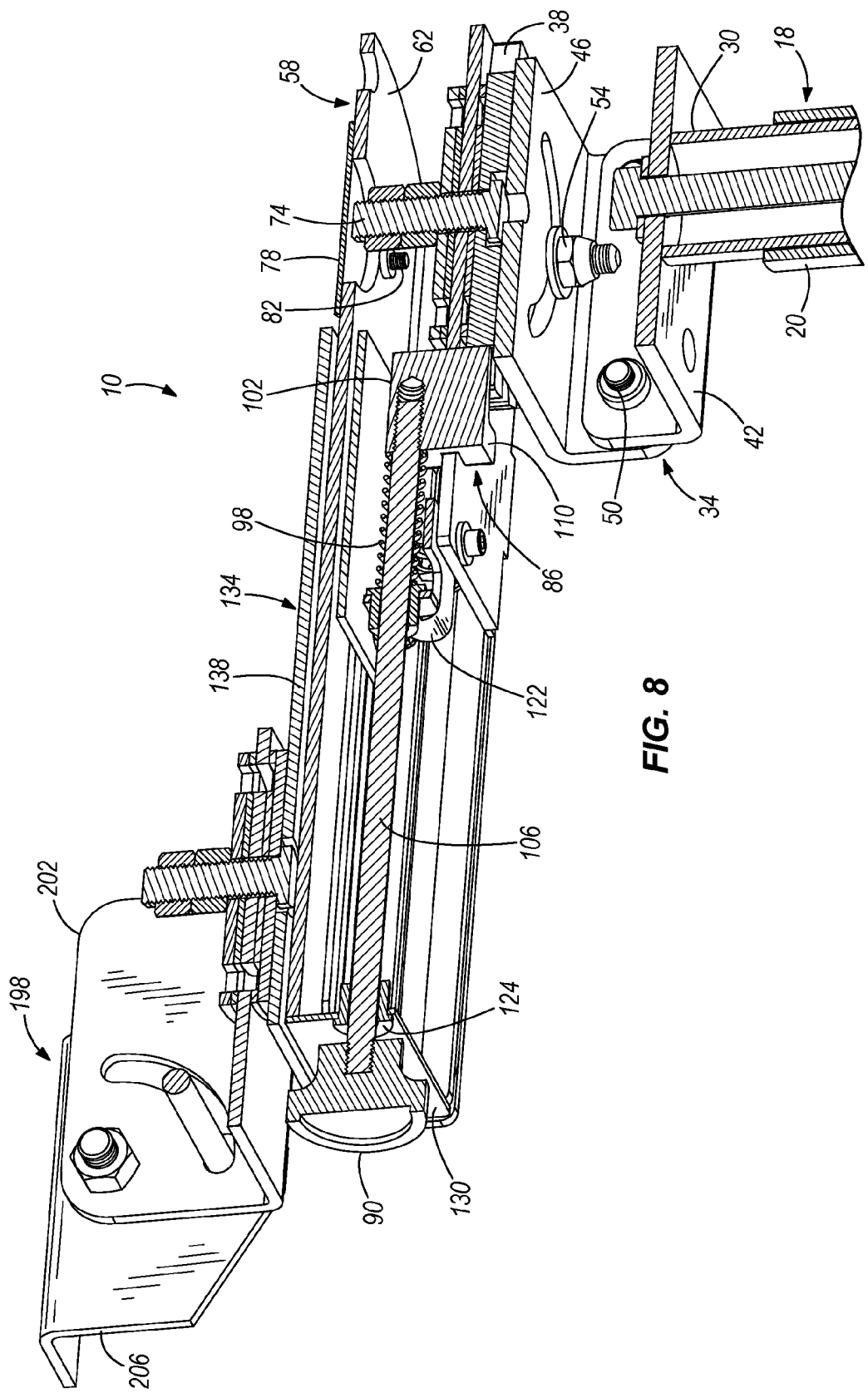
FIG. 8 is a partial section view of the mounting device of FIG. 1 taken along line 8-8 of FIG. 2.

With reference to FIG. 1, the mounting device 10 includes a support member in the form of a pedestal 18 having a tubular body 20 with a first end 22 coupled to a flange 26 for securing the pedestal 18 to the support structure 16 with fasteners 28 or other fastening means. The configuration of the flange 26 can be altered from the illustrated arrangement as needed depending upon the specific support structure 16 and the surrounding environment. As best shown in FIGS. 1 and 8, the second end 30 of the body 20 of the pedestal 18 is coupled to a wheel support structure 34 configured to support a toothed wheel 38 in a fixed rotational orientation relative to the pedestal 18. The illustrated wheel support structure 34 includes a first, upwardly-oriented U-shaped member 42 and a second, downwardly-oriented U-shaped member 46 coupled together with fasteners 50. The toothed wheel 38 is coupled to the second U-shaped member 46 by fasteners 54 (see also FIG. 4) passing through the toothed wheel 38 and the second U-shaped member 46 to secure the toothed wheel 38 in a fixed rotational orientation relative to the second U-shaped member 46, and therefore relative to the pedestal 18. In alternative embodiments, other arrangements for securing the toothed wheel 38 to the pedestal 18 can be substituted. In yet other embodiments, the toothed wheel 38 could be mounted so as to be rotatable relative to the pedestal 18, and the base (to be discussed below) could be mounted to the toothed wheel 38 in a fixed, non-rotatable manner to achieve the relative rotation between the base and the pedestal 18. While the illustrated pedestal body 20 is generally cylindrical in shape, other tubular geometry can be substituted. Additionally, as shown in FIG. 8, multiple tubular parts can be incorporated to make the mounting device 10 easier to install and orient, as well as to achieve the appropriate height for the pedestal 18 depending on the specific application. In some embodiments, the pedestal 18 can include a telescoping adjustment feature for height adjustment. In other embodiments, a different, non-pedestal-type support member may be substituted.

Figure 9:
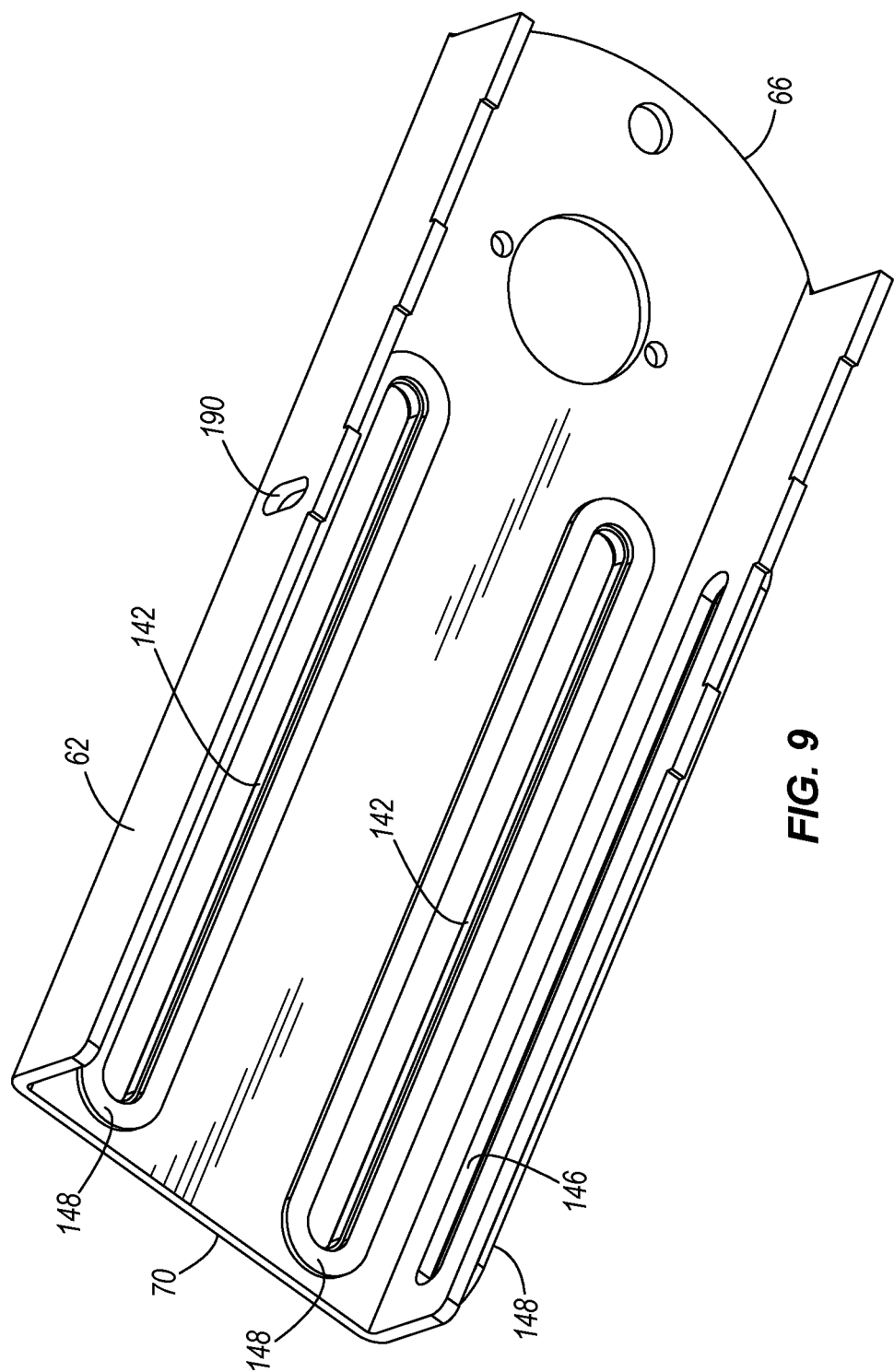
FIG. 9 is a bottom perspective view of the base of the mounting device of FIG. 1, with some parts removed for clarity.

The mounting device 10 further includes a base 58 configured to be coupled to the support 16, and in the illustrated embodiment, the base 58 is coupled to the pedestal 18 to permit selective rotation of the base 58 relative to the pedestal 18. In the illustrated embodiment, the base 58 includes an elongated, downwardly-oriented U-shaped member 62 (see also FIG. 9 showing the U-shaped member 62 alone) having a first end 66 adjacent the pedestal 18, and a second end 70 spaced from the pedestal 18. The first end 66 is rotatably coupled to the pedestal 18 by a mounting member 74 (e.g., a bolt, rivet, etc.—see FIGS. 4 and 8) coupled with the member 62 and that passes through the center of the toothed wheel 38. The mounting member 74 renders the member 62 rotatable relative to the toothed wheel 38, and therefore relative to the pedestal 18. The mounting member 74 can be accessed through a movable plate 78 coupled with the top surface of the U-shaped member 62. In the illustrated embodiment, one of two fasteners 82 can be loosened to allow the plate 78 to rotate, thereby exposing the mounting member 74.

Figure 4:
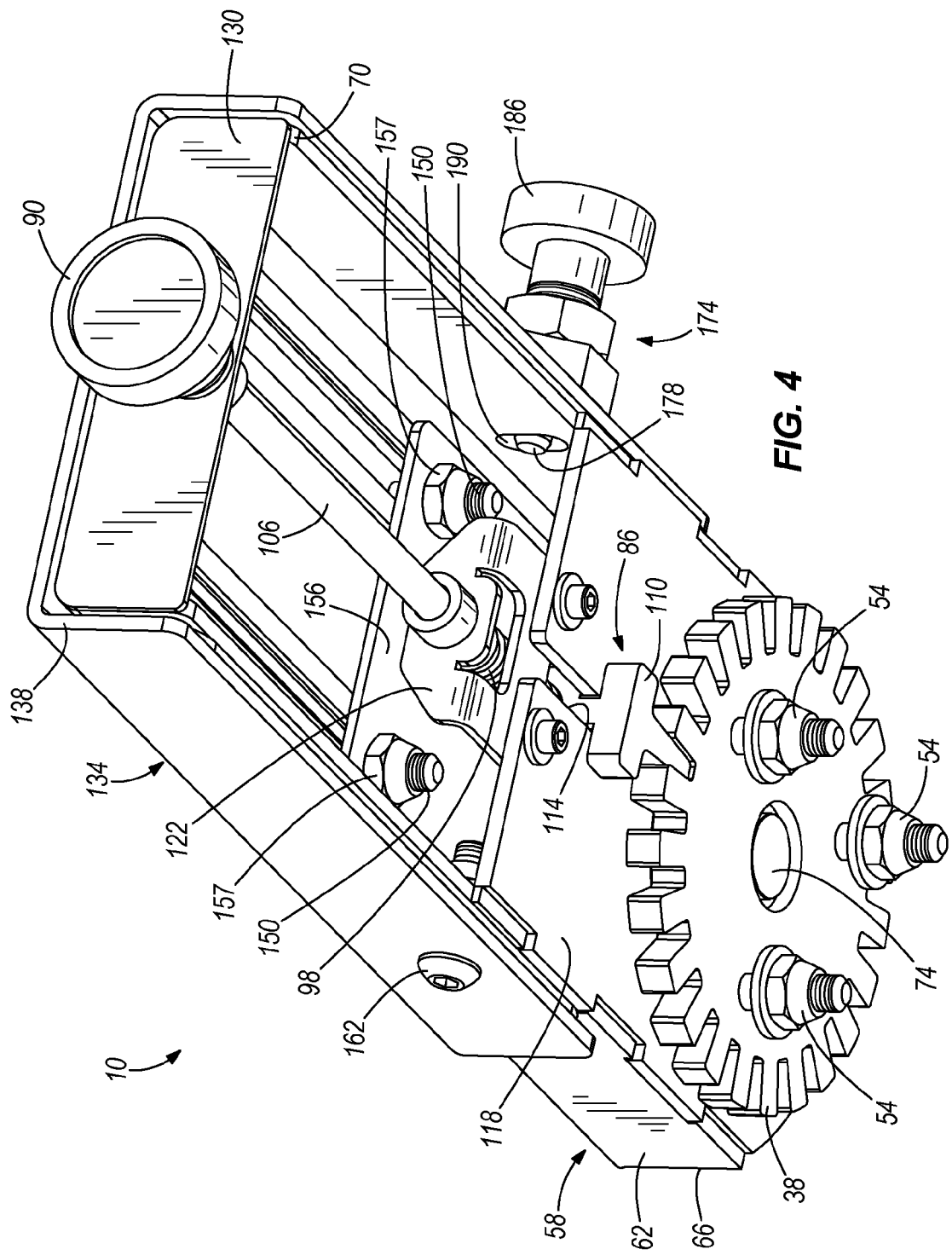
FIG. 4 is a bottom perspective view, with some parts removed for clarity, of the mounting device of FIG. 1, shown in a locked position preventing rotation.
Figure 5:
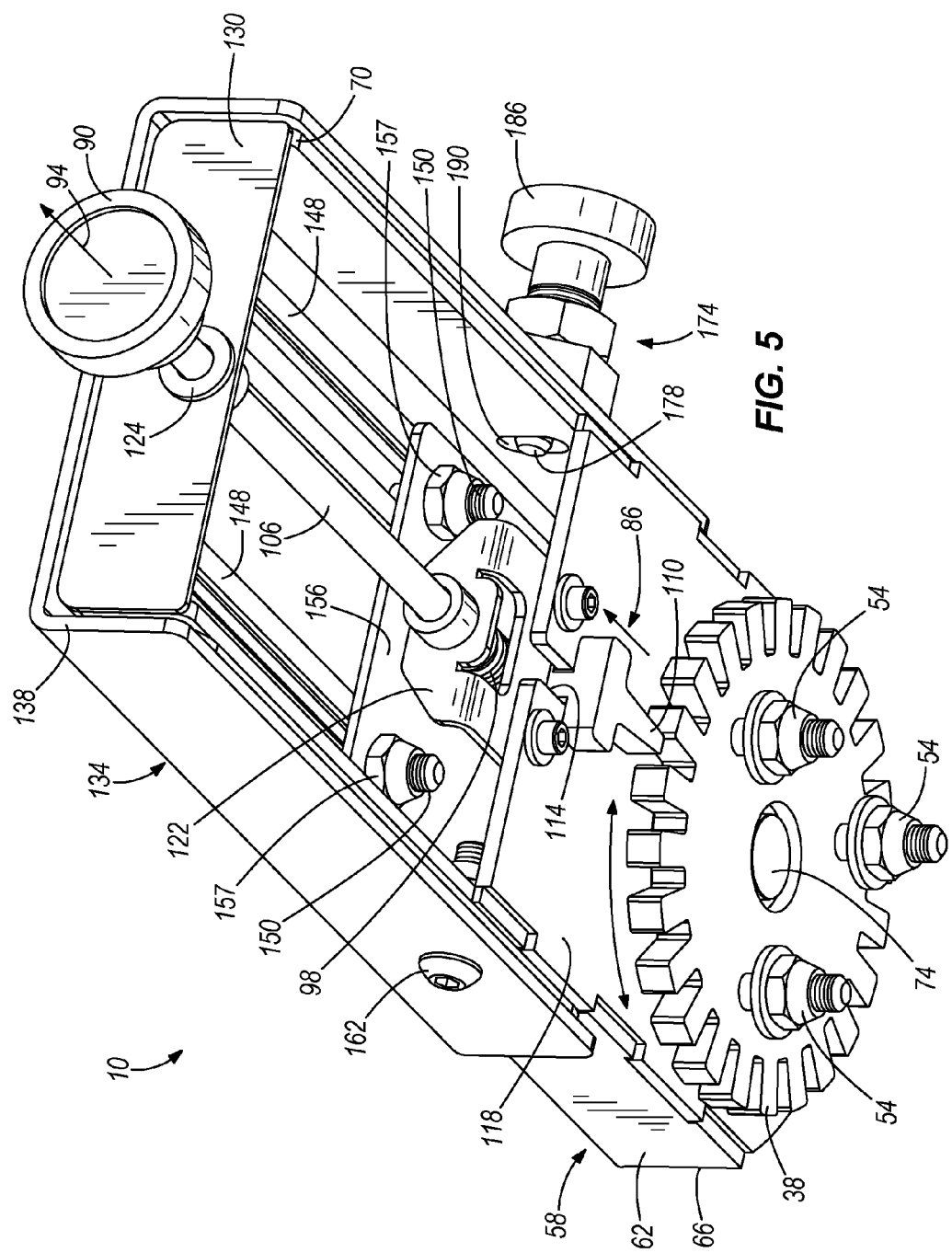
FIG. 5 is a bottom perspective view, with some parts removed for clarity, of the mounting device of FIG. 1, shown in an unlocked position allowing rotation.

The base 58 can be rotated 360 degrees relative to the pedestal 18 by virtue of the toothed wheel 38 and a pawl 86 selectively engageable with the toothed wheel 38. As best shown in FIGS. 4, 5, and 8, the pawl 86 is coupled to a knob 90 that can be selectively manipulated or pulled by a user in the direction of arrow 94 to disengage the pawl 86 from the toothed wheel 38 (see FIG. 5), thereby permitting rotation of the base 58 relative to the toothed wheel 38, and therefore relative to the pedestal 18. The knob 90 is biased (e.g., by a spring 98) into an engaged position with the toothed wheel 38 (see FIG. 4) that prevents rotation of the base 58 relative to the toothed wheel 38, and therefore relative to the pedestal 18. In the illustrated embodiment, the toothed wheel 38 is configured to provide locking points at fifteen degree intervals (i.e., adjacent valleys between the teeth of the toothed wheel 38 are about fifteen degrees apart). Thus, the user can rotationally orient the base 58 relative to the pedestal 18 at a desired rotational orientation to facilitate ergonomic and accessible use of the computer 14 or other mounted device.

The construction of the assembly including the pawl 86 and the knob 90 can vary as desired, but in the illustrated embodiment, the pawl 86 has an upper portion 102 that receives a shaft 106 coupled to the knob 90. A lower portion 110 of the pawl 86 extends downwardly through a slot 114 in a plate 118 to engage the toothed wheel 38. A mounting bracket 122 is coupled to the plate 118 and receives the shaft 106. The spring 98 that biases the pawl 86 into engagement with the toothed wheel 38 abuts (directly or indirectly) the mounting bracket 122 on one end and the upper portion 102 of the pawl 86 on the other end. The end of the shaft 106 coupled to the knob 90 is supported in a sleeve 124 in an opening of an endplate 130 coupled to the U-shaped member 62 of the base 58.

Figure 3:
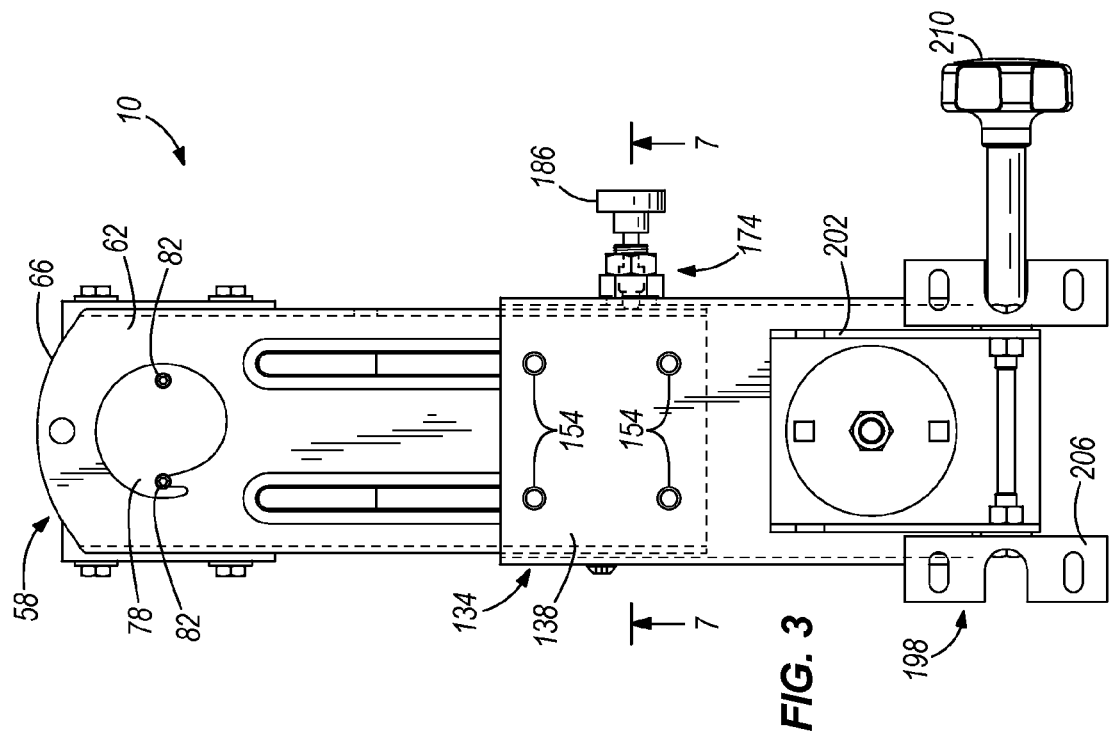
FIG. 3 is a top view of the mounting device of FIG. 1, shown in a fully extended position.
Figure 7:
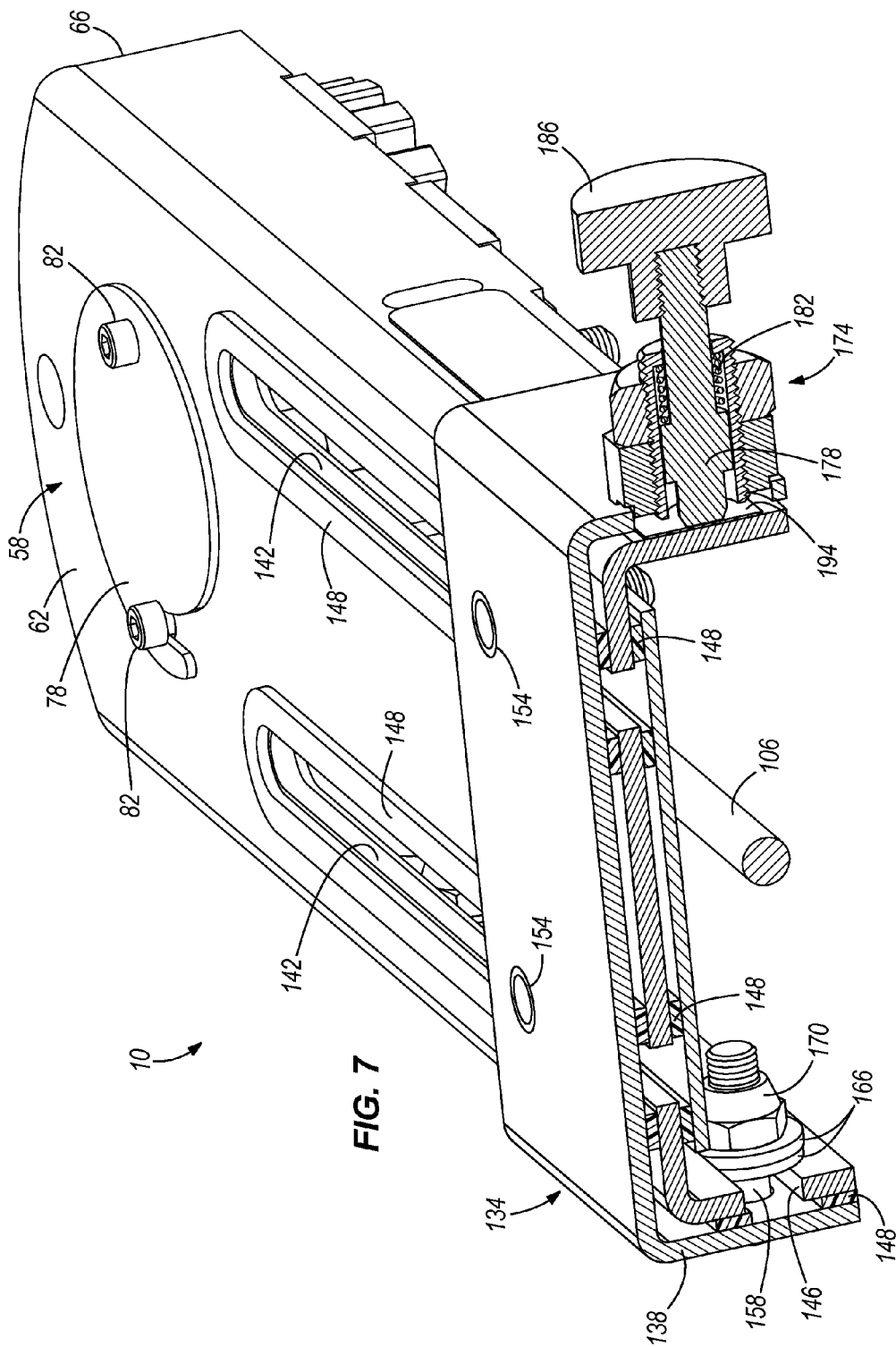
FIG. 7 is a section view, with some parts removed for clarity, of the mounting device of FIG. 1 taken along line 7-7 of FIG. 3.

The mounting device 10 further includes a slide arm 134 coupled to the base to be movable between a retracted position (see FIGS. 2 and 5) and a fully extended position (see FIGS. 3 and 7). The slide arm 134 enables the user to position the computer 14 or other device mounted on the mounting device 10 at a comfortable position for use by sliding the slide arm 134 along the base 58 to any of the retracted position, the fully extended position, or any of the plurality of extended positions between the retracted position and the fully extended position. The slide arm 134 includes a downwardly-facing U-shaped member 138 sized and configured to fit over the U-shaped member 62 of the base for sliding engagement.

Figure 6:
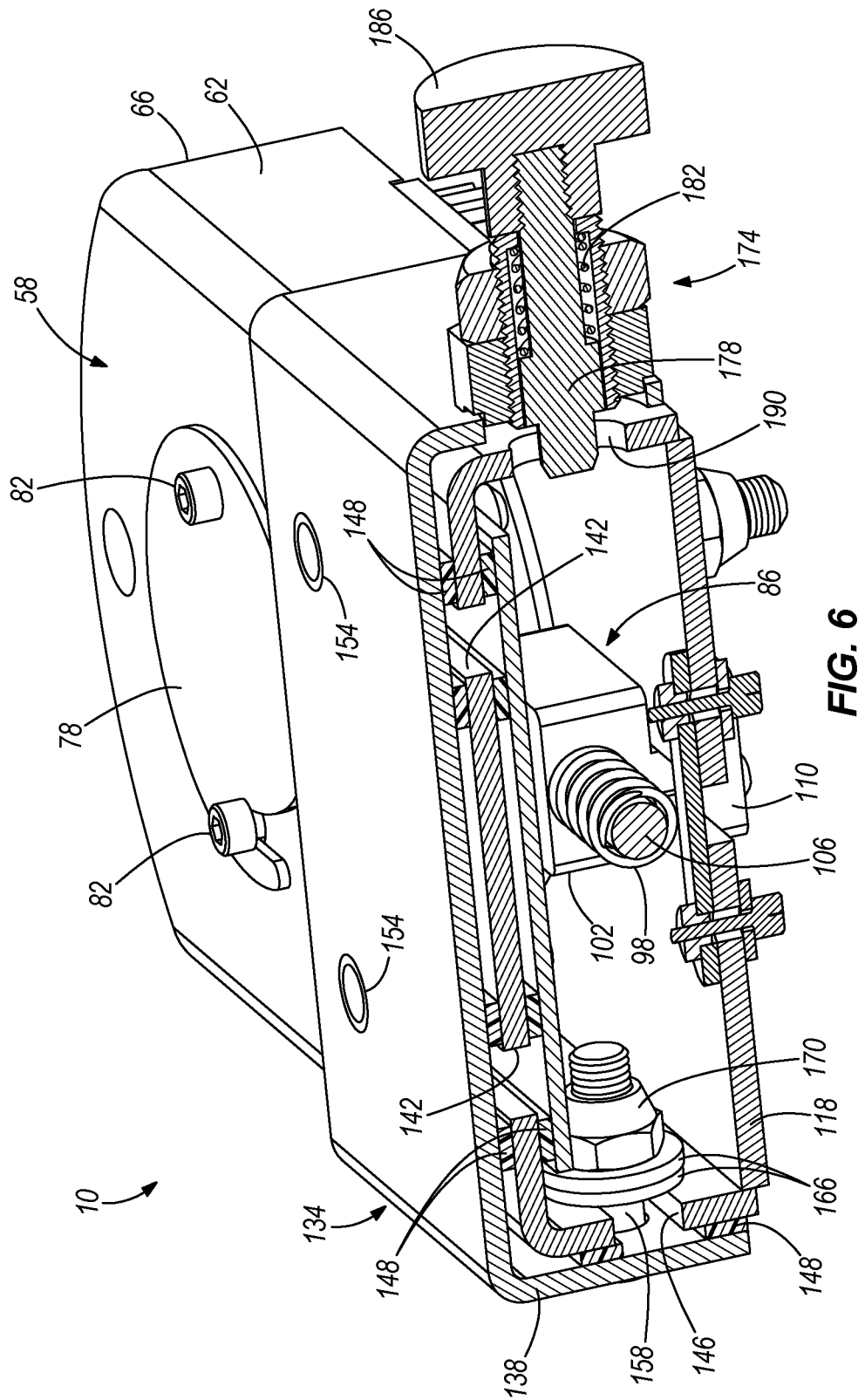
FIG. 6 is a section view, with some parts removed for clarity, of the mounting device of FIG. 1 taken along line 6-6 of FIG. 2.

Referring to FIGS. 6, 7, and 9, the mounting device 10 includes a series of slot and projection arrangements between the slide arm 134 and the base 58 to guide the sliding movement of the slide arm 134 relative to the base 58. In the illustrated embodiment, the U-shaped member 62 of the base includes two slots 142 formed in a top surface of the member 62 and a single slot 146 formed in a sidewall of the member 62. As illustrated, the slots 142 and 146 can be surrounded by spacing members 148 that facilitate relative sliding motion of the member 138 along the member 62. The spacing members 148 can be a low-friction material (e.g., Nylon) that facilitates relative sliding, while preventing metal-to-metal contact between the members 138 and 62 that could otherwise damage or degrade the finish (e.g., wearing away paint or other surface finishes).

Projections are coupled with the slide arm 134 and are received in the slots 142, 146. As seen in FIGS. 4 and 5 (only two are shown), four projections 150 extend downwardly from heads 154 that are generally flush with the top surface of the member 138, two of the projections 150 being received in each slot 142. The four projections 150 are in the form of bolts, that are secured to a plate 156 (e.g., by nuts 157) that moves with and forms part of the slide arm 134. Likewise, as seen in FIGS. 6 and 7, a single projection 158, in the form of a bolt, is received in the slot 146. The bolt 158 has a head 162 (see FIGS. 4 and 5) and is received in an opening in the member 138. Washers 166 and a nut 170 secure the bolt 158 for sliding movement relative to the slot 146. Those skilled in the art will understand that while the slots 142 and 146 are shown in the base 58 and the projections 150 and 158 are shown coupled to the slide arm 134, the reverse could be practiced, with the slots formed in the slide arm 134 and the projections coupled to the base 58.

Figure 2:
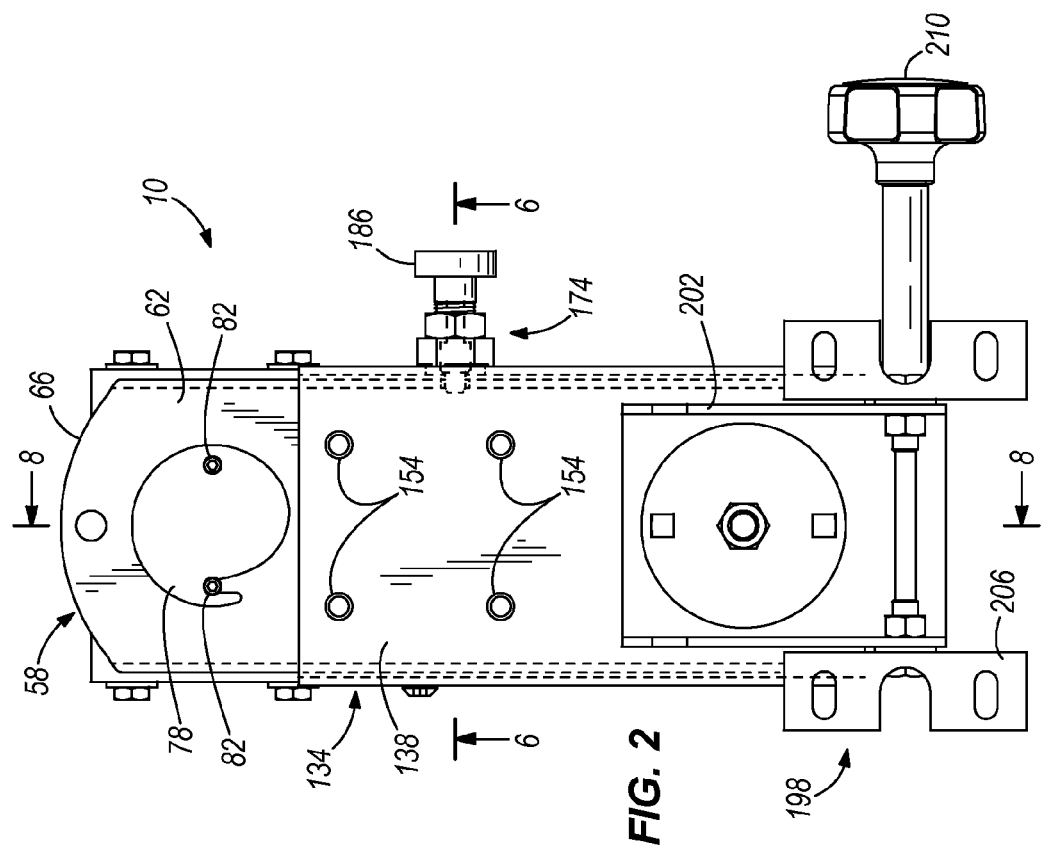
FIG. 2 is a top view of the mounting device of FIG. 1, shown in a retracted position.

In addition to guiding the sliding motion of the slide arm 134 relative to the base 58, the slot and projection arrangements also limit the extent of travel of the slide arm 134 relative to the base 58. With reference to FIGS. 1, 4, 5, 6, 8, and 9 the fully retracted position of the slide arm 134 relative to the base 58 is defined as the position where the projection 158 abuts the end of the slot 146 that is the closest to the first end 66 of the member 62. In the same manner, the two projections 150 closest to the first end 66 abut the ends of the slots 142 closest to the first end 66. With reference to FIGS. 2 and 7, the extent of travel of the slide arm 134 to the fully extended position is limited by the projection 158 abutting the end of the slot 146 that is closest to the second end 70 of the member 62. In the same manner, the two projections 150 closest to the second end 70 abut the ends of the slots 142 closest to the second end 70. Therefore, the ends of the slots 142 and 146 define hard stops for the retracted and fully extended positions of the slide arm 134 relative to the base 58.

The mounting device 10 further includes a locking mechanism 174 coupled with at least one of the slide arm 134 and the base 58 and that is operable to lock the slide arm 134 relative to the base 58 only when the slide arm 134 is in the retracted position. The locked position of the locking mechanism 174 is shown in FIGS. 4-6. In all other positions (i.e., positions other than the retracted position), the locking mechanism is in an unlocked position (see FIG. 7) and does not lock the slide arm 134 relative to the base 58, but instead permits relative sliding between the slide arm 134 and the base 58.

Referring to FIGS. 4-6, the locking mechanism 174 includes a plunger 178 biased toward the locked position by a biasing member (e.g., a spring 182—see FIG. 6). A knob 186 is coupled to one end of the plunger 178 to facilitate manipulation or pulling of the locking mechanism 174 by the user to unlock the slide arm 134 relative to the base 58. The end of the plunger 178 opposite the knob 186 is configured to be received in an opening or aperture 190 formed in the U-shaped member 62 of the base 58 to lock the slide arm 134 relative to the base 58 in the retracted position. While the locking mechanism 174 is illustrated as being coupled to the slide arm 134 and the opening 190 is formed in the base 58, other arrangements can be substituted, including those in which the locking mechanism 174 is coupled with the base 58 and the opening 190, or other plunger-receiving feature, is formed in the slide arm 134.

In operation, to move the slide arm 134 from the retracted position to any of the plurality of extended positions (including the fully extended position), the user pulls on the knob 186, overcoming the bias of the spring 182, to withdraw the opposite end of the plunger 178 from the opening 190 in the base 58. The slide arm 134 is then free to slide relative to the base 58, as guided by the slot and projection arrangements. The user can move the slide arm 134 to the desired position relative to the base 58 and can release the knob 186 once the slide arm 134 is moved out of the retracted position. The spring bias on the plunger 178 will bias the end of the plunger 178 opposite the knob 186 into engagement with a surface of a sidewall of the U-shaped member 62 of the base 58, as shown in FIG. 7. The surface of the sidewall of the member 62 that engages the plunger 178 can include an added layer of material 194 (e.g., Nylon) that facilitates the sliding engagement of the plunger 178 as the slide arm 134 slides along the base 58 between the plurality of extended positions, while preventing metal-to-metal contact between the member 62 and the plunger 178 that could otherwise damage or degrade the finish of the member 62 (e.g., wearing away paint or other surface finishes).

Features of the slot and projection arrangements are operable to selectively increase and decrease the sliding friction between the slide arm 134 and the base 58. Specifically, the nuts 157 and 170 can be tightened or loosened as desired to increase or decrease the sliding friction between the slide arm 134 and the base 58. As seen in FIG. 5, by tightening the nuts 157, the pressure exerted by the plate 156 on the spacing members 148 is increased, thereby increasing the sliding friction between the slide arm 134 and the base 58. Likewise, as seen in FIG. 6, by tightening the nut 170, the pressure exerted by the washers 166 against the sidewall of the member 62 is increased, thereby increasing the friction between the slide arm 134 and the base 58. This will help to control the relative sliding of the slide arm 134 and the base 58 frictionally, without requiring the need for multiple, predetermined locked positions, or the need for a set-screw locking arrangement.

As best shown in FIGS. 1-3 and 8, the mounting device 10 further includes a mounting assembly 198 coupled to the slide arm 134 for mounting the computer 14 or other device to the mounting device 10. In the illustrated embodiment, the mounting assembly 198 is in the form of an attachment clevis having a base bracket 202 coupled to the member 138 of the slide arm 134 and a mount bracket 206 coupled to the base bracket 202. The computer 14 or other device is mounted to the mount bracket 206 using conventional fasteners. The mount bracket 206 can pivot relative to the base bracket 202 to allow the user to orient the computer 14 as desired. In the illustrated embodiment, a knob 210 connected to the mount bracket 206 is manipulated by the user to permit pivoting of the mount bracket 206 up to about ninety degrees. The illustrated mounting assembly 198 is just one possible mounting arrangement that can be used with the mounting device 10. Other mounting arrangements can be substituted as desired, and for facilitating use with different devices that are mounted to the mounting device 10.

The mounting device 10 of the present invention is operable by a user without requiring as much manual manipulation of locking features as is common in prior art mounting devices. Specifically, unlocking the locking mechanism 174 requires only that the user pull on the knob 186 and slide the slide arm 134 out of the retracted position, which can be done simply by pulling the mounted computer 14. Once the slide arm 134 is out of the retracted position, the user can release the knob 186. The slide arm 134 is then manually movable, as countered only by adjustable friction force (as adjusted by the tightness of the nuts 157 and 170), to any of the plurality of extended positions. No further manual manipulation of locking devices (e.g., set screws or levers) is needed to adjust the position of the slide arm 134 relative to the base 58. Furthermore, when it is desired to move the slide arm 134 to the retracted and locked position for stowage of the computer 14, the user need only push the mounted computer 14 or the slide arm 134 toward the retracted position. The slide arm 134 will slide toward the retracted position, as opposed only by friction, until the projections 150 and 158 reach the ends of the respective slots 142 and 146, and the plunger 178 of the locking mechanism automatically engages the opening 190 in the member 62 under the bias of the spring 182. Only after the plunger 178 is received in the opening 190 is the slide arm 134 locked relative to the base 58 in the retracted position.

Those skilled in the art will envision the usefulness of this arrangement. For example, if the mounting device 10 is used in a police vehicle, and the officer using the computer 14 needs to quickly stow the computer 14 for travel, he need only push the computer 14 toward the retracted position to slide the slide arm 134 to the retracted position, where it will automatically lock when the slot and projection arrangement stops the travel of the slide arm 134 in the retracted position, and the locking mechanism 174 automatically locks the slide arm 134 in the retracted position. No other loosening and re-tightening of any set screw or knob, or manipulation of any locking lever is required. The officer need only push to achieve the stowed and automatically locked state of the mounting device 10. This capability can be referred to as a "slam and lock" capability of the mounting device 10.

Various features and advantages of the invention are set forth in the following claims.

The invention claimed is:

1. A mounting device for mounting an object on a support, the mounting device comprising:
   a support member;
   a base coupled to the support member to permit selective rotation of the base relative to the support member;
   a slide arm coupled to the base and movable between a retracted position and a plurality of extended positions; and
   a locking mechanism coupled with at least one of the slide arm and the base and operable to lock the slide arm relative to the base only when the slide arm is in the retracted position, wherein the locking mechanism includes a portion that can be grasped and pulled away from the base by a user to release the slide arm and base from a locked position relative to one another.

2. The mounting device of claim 1, wherein the base can rotate 360 degrees relative to the support member.

3. The mounting device of claim 1, wherein a toothed wheel is coupled between the support member and the base, and wherein the mounting device further includes a pawl selectively engageable with the toothed wheel to prevent rotation of the base relative to the support member when the pawl is engaged with the toothed wheel and to permit rotation of the base relative to the support member when the pawl is disengaged from the toothed wheel.

4. The mounting device of claim 3, wherein the pawl is biased into engagement with the toothed wheel and is coupled to a knob to facilitate manipulation of the pawl by a user.

5. The mounting device of claim 1, wherein the locking mechanism is in an unlocked position in all of the plurality of extended positions and automatically moves to a locked position when the slide arm is moved to the retracted position.

6. The mounting device of claim 5, wherein the locking mechanism can only be moved from the locked position to the unlocked position by manipulation of the locking mechanism by a user.

7. The mounting device of claim 6, wherein the locking mechanism includes a plunger biased toward the locked position, the locked position being achieved when the plunger enters an aperture in the base.

8. The mounting device of claim 1, wherein the base includes one of a slot and at least one projection and the slide arm includes the other of the slot and the at least one projection, the at least one projection received in the slot such that an extent of travel of the at least one projection in the slot defines an extent of travel of the slide arm between the retracted position and a fully-extended position.

9. The mounting device of claim 1, wherein the support member is a pedestal.

10. A mounting device for mounting an object on a support, the mounting device comprising:
   a base configured to be coupled to the support;
   a slide arm coupled to the base and movable between a retracted position and a plurality of extended positions; and
   a locking mechanism coupled with at least one of the slide arm and the base and operable to lock the slide arm relative to the base only when the slide arm is in the retracted position, the locking mechanism including a plunger biased toward the locked position, the locked position being achieved when the plunger enters an aperture in the base, and a knob coupled to the plunger to facilitate manipulation of the locking mechanism by a user, wherein the locking mechanism is in an unlocked position in all of the plurality of extended positions and automatically moves to a locked position when the slide arm is moved to the retracted position and can only be moved from the locked position to the unlocked position by a user grasping and pulling the knob away from the base.

11. A mounting device for mounting an object on a support, the mounting device comprising:
   a base configured to be coupled to a support member of the mounting device to permit selective rotation of the base relative to the support member, wherein the support member is configured to be coupled to the support;
   a slide arm coupled to the base and movable between a retracted position and a plurality of extended positions;
   a locking mechanism coupled with at least one of the slide arm and the base and operable to lock the slide arm relative to the base only when the slide arm is in the retracted position; and
   a toothed wheel coupled between the support member and the base, wherein the mounting device further includes a pawl selectively engageable with the toothed wheel to prevent rotation of the base relative to the support member when the pawl is engaged with the toothed wheel and to permit rotation of the base relative to the support member when the pawl is disengaged from the toothed wheel.

12. The mounting device of claim 11, wherein the pawl is biased into engagement with the toothed wheel and is coupled to a knob to facilitate manipulation of the pawl by a user.

13. A mounting device for mounting an object on a support, the mounting device comprising:
   a support member;
   a base coupled to the support member to permit selective rotation of the base relative to the support member;
   a toothed wheel coupled between the support member and the base;
   a pawl selectively engageable with the toothed wheel to prevent rotation of the base relative to the support member when the pawl is engaged with the toothed wheel and to permit rotation of the base relative to the support member when the pawl is disengaged from the toothed wheel;
   a slide arm coupled to the base and movable between a retracted position and a plurality of extended positions; and
   a locking mechanism coupled with at least one of the slide arm and the base and operable to lock the slide arm relative to the base only when the slide arm is in the retracted position.

14. The mounting device of claim 13, wherein the pawl is biased into engagement with the toothed wheel and is coupled to a knob to facilitate manipulation of the pawl by the user.

* * * * *